(12) United States Patent
Thor et al.

(10) Patent No.: US 8,818,663 B2
(45) Date of Patent: *Aug. 26, 2014

(54) DETERMINING ONCOMING CLUTCH PRESSURE IN A TRANSMISSION

(75) Inventors: Todd J. Thor, Byron, MI (US); Brian M. Porto, Waterford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 112 days.

This patent is subject to a terminal disclaimer.

(21) Appl. No.: 13/557,788

(22) Filed: Jul. 25, 2012

(65) Prior Publication Data
US 2014/0032064 A1    Jan. 30, 2014

(51) Int. Cl.
*G06F 7/00*    (2006.01)
(52) U.S. Cl.
USPC .............................................. 701/54; 701/67
(58) Field of Classification Search
CPC ....................................................... G06F 17/00
See application file for complete search history.

(56) References Cited

U.S. PATENT DOCUMENTS

| | | | |
|---|---|---|---|
| 8,510,005 B1 * | 8/2013 | Monajemi et al. ............... 701/67 |
| 2004/0030470 A1 * | 2/2004 | De La Salle et al. ............ 701/22 |
| 2008/0039286 A1 * | 2/2008 | Asami et al. ................... 477/156 |
| 2008/0182715 A1 * | 7/2008 | Dickinson ........................ 477/97 |
| 2011/0190991 A1 * | 8/2011 | Araki et al. ...................... 701/58 |
| 2012/0010046 A1 * | 1/2012 | Yacoub et al. ................... 477/86 |
| 2012/0130608 A1 * | 5/2012 | Fujii et al. ........................ 701/54 |
| 2012/0130610 A1 * | 5/2012 | Lee et al. ......................... 701/58 |
| 2012/0316738 A1 * | 12/2012 | Teslak et al. .................... 701/53 |
| 2013/0008754 A1 * | 1/2013 | Wilke et al. ................... 192/3.54 |
| 2013/0231834 A1 * | 9/2013 | Thor ............................... 701/68 |
| 2013/0231835 A1 * | 9/2013 | Thor ............................... 701/68 |

OTHER PUBLICATIONS

Xingyong Song, Mohd Azrin Mohd Zulkefli and Zongxuan Sun, "Automotive Transmission Clutch Fill Optimal Control: An Experimental Investigation", Jul. 2, 2010, 2010 American Control Conference, Doc No. 978-1-4244-7427-1/10.*

* cited by examiner

*Primary Examiner* — Calvin Cheung
*Assistant Examiner* — Krishnan Ramesh
(74) *Attorney, Agent, or Firm* — Quinn Law Group, PLLC

(57) ABSTRACT

Clutch pressure of an oncoming clutch may be determined during an upshift in an automatic transmission by determining when offgoing and oncoming clutches of the transmission near a speed synchronization point. Aboard a vehicle, proportional-integral-derivative (PID) feedback control logic of for the oncoming clutch may be activated via a controller. The controller and the activated PID logic may be used to introduce a calibrated slip error between the rotational speeds of the offgoing and oncoming clutches. Engine speed is then held in a calibrated flare using the PID logic. Oncoming clutch pressure is recorded during the duration of the calibrated flare, and a control action is executed with respect to the transmission using the recorded oncoming clutch pressure, e.g., using recorded PID gains and/or a pressure/torque relationship of the oncoming clutch. A vehicle having an engine, transmission, and controller may use the controller to execute such a method.

19 Claims, 1 Drawing Sheet

US 8,818,663 B2

DETERMINING ONCOMING CLUTCH PRESSURE IN A TRANSMISSION

TECHNICAL FIELD

The present disclosure relates to a system and method for determining oncoming clutch pressure in a transmission during a power upshift.

BACKGROUND

The clutches of an automatic transmission may be selectively engaged to execute a clutch-to-clutch power upshift to a higher gear state. A controller is used to synchronize clutch speeds, and to thereafter coordinate the transfer of torque within the transmission. The controller ensures that the particular clutch associated with the current speed ratio (the off-going clutch) smoothly releases while the clutch associated with a desired new speed ratio (the on-coming clutch) smoothly engages. In order to effectively control the shift event, the controller must be aware of the clutch pressure/clutch torque relationship for the oncoming clutch.

SUMMARY

A method is disclosed herein for determining the clutch pressure of an oncoming clutch during an upshift in an automatic transmission. The method includes determining when offgoing and oncoming clutches of the transmission have neared a speed synchronization point to within a calibrated window, and then activating proportional-integral-derivative (PID) feedback control logic for the oncoming clutch using a controller.

The method further includes introducing, via the controller and the activated PID logic, a calibrated slip error between the rotational speeds of the offgoing and the oncoming clutches, and then holding engine speed in a calibrated flare, i.e., at a temporarily elevated speed, using the PID logic. Oncoming clutch pressure is measured and recorded during the duration of the calibrated flare. A control action may then be executed by the controller with respect to the transmission using the recorded oncoming clutch pressure, e.g., associating the clutch pressure with a clutch torque and using the stored relationship in the control of a subsequent shift event.

A vehicle includes an internal combustion engine, an automatic transmission, and a controller. The transmission has an input member that is connected to the engine, and also includes a pair of clutches. The controller, which is in communication with the engine and the transmission, includes a processor and a tangible, non-transitory memory device. Instructions for determining the clutch pressure of an oncoming clutch during an upshift in an automatic transmission are recorded on the memory device, along with PID feedback control logic. Execution of the instructions from memory by the processor causes the controller to execute the above method.

A system for use within a vehicle having an internal combustion engine includes the transmission, which has the pair of clutches and an input member connectable to the engine, and the controller configured substantially as noted above.

The above features and advantages and other features and advantages of the present invention are readily apparent from the following detailed description of the best modes for carrying out the invention when taken in connection with the accompanying drawings.

DETAILED DESCRIPTION

Figure 1:
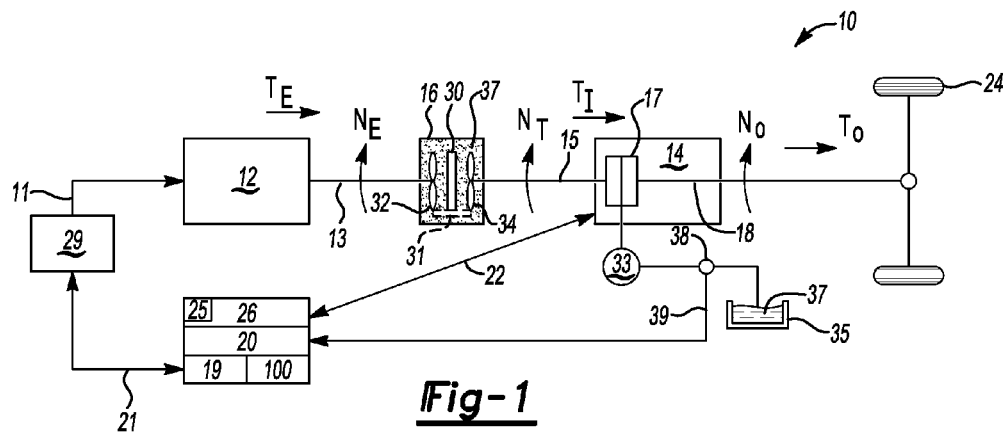
FIG. 1 is a schematic illustration of an example vehicle having an automatic transmission and a controller that uses proportional-integral-derivative (PID)-based control logic to control engine/turbine speed flare during a power upshift to learn oncoming clutch pressure.
Figure 3:
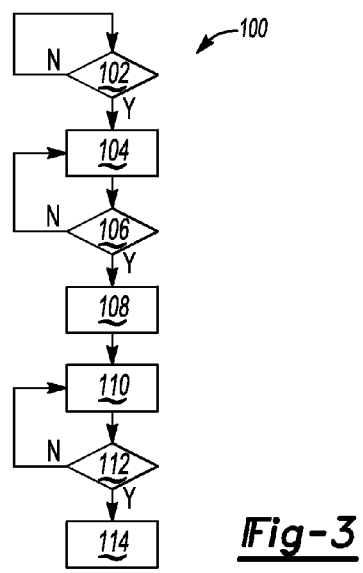
FIG. 3 is a flow chart describing an example method for learning the oncoming clutch pressure in the vehicle of FIG. 1 at the end of a power upshift.

Referring to the drawings, an example vehicle 10 is shown in FIG. 1 that includes an automatic transmission 14 and a controller 26. The controller 26, which includes a processor 19 and at least one tangible, non-transitory memory device 20, selectively executes instructions embodying the present method 100, an example of which is shown in FIG. 3 and explained below. Execution of the method 100 enables the controller 26 to learn an oncoming clutch pressure/clutch torque relationship at the end of a power upshift of the transmission 14.

The controller 26 includes proportional-integral-derivative (PID) control logic 25 of the type known in the art, elements of which may be recorded in the memory device 20. The processor 19 uses the PID control logic 25 to introduce and hold a calibrated flare in engine speed ($N_E$)/turbine speed ($N_T$), i.e., a temporarily elevated speed, near the end of the power upshift. The pressure/torque relationship may be recorded in a lookup table in the memory device 20 during the enforced flare, with the controller 26 using the recorded relationship in the automatic control of a subsequent shift event of the transmission 14.

The example vehicle 10 of FIG. 1 may include an internal combustion engine 12. An engine drive shaft 13 rotates at engine speed ($N_E$) and delivers engine torque ($T_E$) to a hydrodynamic torque converter 16. The torque converter 16 includes a turbine 34 that is directly connected to a transmission input shaft 15. Rotation of the turbine 34 causes the input shaft 15 to rotate at turbine speed (arrow $N_T$). A stator 30 is positioned between an engine-connected pump 32 and the transmission-connected turbine 34. An optional torque converter clutch 31 may be used to selectively lock the pump 32 to the turbine 34 above a threshold lockup speed. Thus, input torque ($T_I$) is delivered to the transmission 14 via the torque converter 16 and input shaft 15. An output shaft 18 of the transmission 14 rotates at an output speed ($N_O$), and ultimately conveys transmission output torque ($T_O$) from the various clutches 17 and associated gear sets of the transmission 14 to a set of drive wheels 24.

The transmission 14 of FIG. 1, which together with the controller 26 forms a system 22, may be configured as any multi-speed transmission, such as a 6-speed or an 8-speed transmission. Thus, the clutches 17, which include at least an offgoing and an oncoming clutch for the particular upshift maneuver being executed as noted above, may be selectively engaged and disengaged as needed using electro-hydraulic controls (not shown). Fluid 37 drawn from a sump 35 by a fluid pump 33 may be used to provide the required line pressure within the transmission 14. A temperature sensor 38 may be used to measure the temperature of the fluid 37, and to communicate the measured temperature (arrow 39) to the controller 26. The measured temperature (arrow 39) may be used by the controller 26 for various control purposes, including calculating any required gains for the PID control logic 25.

The controller 26 shown in FIG. 1 selectively executes the present method 100, via the processor 19, for instance by executing computer code or instructions recorded in the memory device 20. The memory device 20 may include, e.g., read only memory (ROM), electrically-programmable read-only memory (EPROM), optical media, flash memory, etc. The controller 26 may also include sufficient transitory memory, e.g., random access memory (RAM) and the like, and may transmit/receive any transitory signals using such transitory memory as needed.

Additionally, the memory device 20 may include software/code elements of the PID control logic 25 noted above, as well as one or more high-speed digital timers, analog-to-digital (A/D) circuitry, digital-to-analog (D/A) circuitry, digital signal processing devices, and all necessary input/output (I/O) devices and/or other signal conditioning and/or buffer circuitry.

As is well understood in the art, PID control refers to a specific closed-loop feedback approach and associated logic using three control terms: a proportion (P) term, an integral (I) term, and a derivative (D) term. Each term represents the respective present, past, and future/estimated error values of the particular variable being controlled. Gain values are thus associated with each term.

A typical PID-based control approach generates a feed-forward control term (U) into a plant or system being controlled, e.g., the transmission 14 of FIG. 1. The U term may be calculated using the following equation:

$$U = K_P \bullet e + K_I \bullet \int \bullet e \bullet dt + K_D \frac{de}{dt}$$

where $K_P$, $K_I$, and $K_D$ represent the respective calibrated proportional, integral, and derivative gains, and wherein e is the calculated closed-loop error feedback term. The gains may be calculated as part of the present method 100 as noted below.

Still referring to FIG. 1, the vehicle 10 may include an engine control unit (ECU) 29, either as a separate device as shown or partially/fully integrated with the controller 26. In any embodiment, the controller 26 is in communication with the ECU 29 via a communication channel 21, e.g., a controller area network (CAN) bus or a serial bus, with the ECU 29 providing any required engine control values (arrow 11) to the engine 12 as needed. For instance, the controller 26 may request a specific level of engine torque from the ECU 29 during a given shift maneuver, with the ECU 29 responding via any suitable means by increasing or reducing engine torque ($T_E$) as needed.

Figure 2:
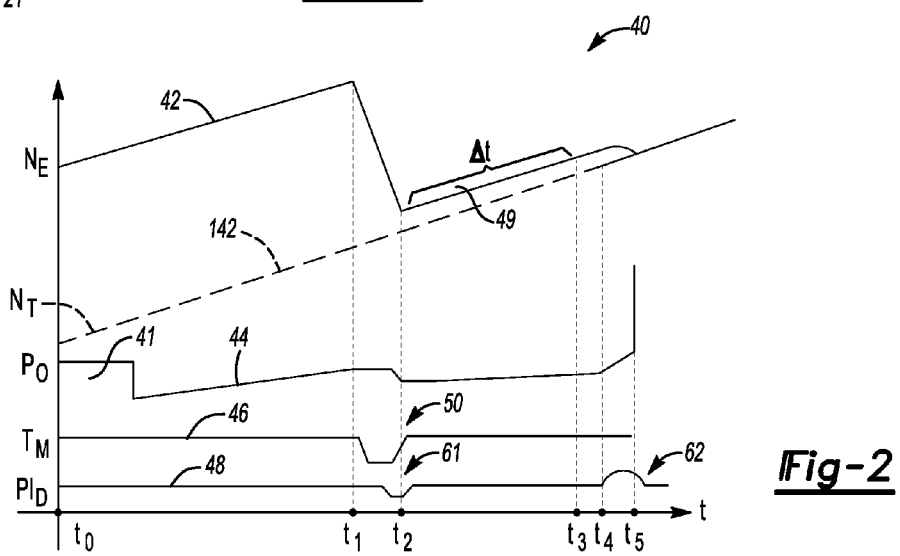
FIG. 2 is a time plot of transmission control values for the vehicle of FIG. 1, with the amplitude of the values depicted on the vertical axis and time depicted on the horizontal axis.

Referring to FIG. 2, a set of control values 40 for the power upshift that is the subject of the present control approach is plotted versus time (t), with time (t) represented on the horizontal axis and the amplitude (A) of the various values 40 represented on the vertical axis. The control values 40 include engine speed ($N_E$), i.e., trace 42, which is the rotational speed of the engine 12 or of the connected turbine 34 shown in FIG. 1. Control values 40 also include offgoing clutch pressure ($P_O$), i.e., trace 44. A derived theoretical turbine speed ($N^*_T$) (trace 142) is provided by the controller 26 as a function of the output torque ($T_O$) to describe the expected trajectory of turbine speed ($N_T$). Additionally, an engine torque management command trace ($T_M$) (trace 46) is shown along with a PID pressure command (PID) (trace 48).

After the controller 26 of FIG. 1 has commanded a power upshift of the transmission 14 prior to $t_0$, oncoming clutch pressure (trace 44) rises to a required level as indicated by pulse 41. Following the pulse 41, the clutch pressure (trace 44) ramps up at a calibrated ramp rate until about $t_1$, which coincides with the peak in engine speed (trace 42). Engine speed (trace 42), which is equal to the turbine speed, also ramps up during the duration $t_0$ to $t_1$, also at a calibrated ramp rate, a duration which corresponds to the torque phase of the upshift. Engine speed (trace 42) then drops between $t_1$ and $t_2$ as the shift enters the inertia phase, and clutch pressure (trace 44) levels out briefly after $t_1$.

Starting at about $t_2$ when engine speed (trace 42) reaches sync speed, the PID pressure command (trace 48) from the PID control logic 25 of FIG. 1 briefly removes pressure (dip 61) from the oncoming pressure command (trace 44) as shown. Engine speed (trace 42) responds by entering the flare 49 and holding this temporarily elevated speed for duration Δt, which is then held until about $t_4$, dropping off to intersect trace 142 at $t_5$. Once the calibrated flare 49 has been held stable for the duration Δt, the controller 26 records the oncoming clutch pressure/output torque relationship in the memory device 20 as noted above. The PID logic 25 then oncoming clutch pressure (trace 44) beginning at $t_4$ to $t_5$, and thereafter oncoming clutch pressure (trace 44) rises quickly to the level needed for transferring torque and completing the upshift.

Referring to FIG. 3 in conjunction with the structural elements of the vehicle 10 shown in FIG. 1 and the control values 40 of FIG. 2, an example method 100 for learning oncoming clutch pressure during a power upshift in the example vehicle 10 of FIG. 1 begins at step 102, wherein the controller 26 determines when an offgoing clutch and an oncoming clutch of the transmission have neared a speed synchronization point to within a calibrated window. Step 102 may entail determining whether a calibrated time-to-synchronization, as measured from initiation of the upshift, has elapsed, such as by using a timer. The remainder of method 100 is executed only after this calibrated time has elapsed. The controller 26 then proceeds to step 104.

At step 104, after $t_1$ in FIG. 2, the controller 26 requests a drop in torque management from the ECU 29 of FIG. 1, as indicated by the dip 50 in the torque management command trace (trace 46) beginning at about $t_1$, and holding until about $t_2$. As part of step 104, the controller 26 may activate the PID logic 25 and introduce, via the activated PID logic 25, a calibrated slip error across the oncoming and offgoing clutches. For instance, a slip error of about 30 to 50 RPM, i.e., +/−10%, may be commanded in one embodiment.

In another embodiment, the slip error may be about 40 RPM, i.e., +/−10%. While other values may be selected, the value should be low enough not to adversely affect shift quality and yet high enough to provide meaningful learning data in the subsequent steps. Execution of step 104, including the dip 61 in the PID command trace (trace 48) shortly before $t_2$, results in the flare 49 shown in FIG. 2. The controller 26 then initiates a timer and proceeds to step 106.

At step 106, the controller 26 determines whether the flare 49 has been stable within an allowable tolerance for a calibrated duration (Δt) of, for instance, 100-200 ms. If flare stability is seen for the duration (Δt), the controller 26 proceeds to step 108. Otherwise, the controller 26 executes steps 104 and 106 in a loop until the slip error/resultant flare 49 has been stable for the calibrated duration (Δt).

At step 108, shortly before or at $t_3$ the controller 26 records the oncoming clutch pressure in the memory device 20 for the level of output torque. The recorded oncoming clutch pressure may be associated with output torque in a lookup table.

PID gains may be calculated thereafter by the processor 19 and used by the controller 26 in the control of subsequent shift events.

At step 110, after learning the pressure/torque relationship for the oncoming clutch in step 108, the controller 26 exits the enforced flare condition after the duration At has elapsed, e.g., by extending the slip error briefly to $t_4$. The controller 26 then proceeds to step 112.

At step 112, the controller 26 next determines whether a zero slip error is present. If a non-zero slip error is present, the controller 26 executes step 110 in a loop until slip error reaches zero, i.e., at about $t_5$, at which point the controller 26 proceeds to step 114.

At step 114, the controller 26 rapidly increases oncoming clutch pressure (trace 44) to the required level for completing the torque phase of the shift. This event occurs at about $t_5$ in FIG. 2, and is triggered by a rise 62 in the PID control trace (trace 48).

While the best modes for carrying out the invention have been described in detail, those familiar with the art to which this invention relates will recognize various alternative designs and embodiments for practicing the invention within the scope of the appended claims.

The invention claimed is:

1. A method for determining the clutch pressure of an oncoming clutch during an upshift in an automatic transmission, the method comprising:
   determining when an offgoing clutch and an oncoming clutch of the transmission have neared a speed synchronization point to within a calibrated window;
   activating proportional-integral-derivative (PID) feedback control logic of for the oncoming clutch using a controller;
   introducing, via the controller and the activated PID logic, a calibrated slip error between the rotational speeds of the offgoing and the oncoming clutches;
   holding engine speed in a calibrated flare using the PID logic;
   recording the oncoming clutch pressure during the duration of the calibrated flare; and
   executing a control action with respect to the transmission using the recorded oncoming clutch pressure.

2. The method of claim 1, wherein determining when the offgoing and oncoming clutches have neared the speed synchronization point includes determining whether a calibrated time-to-synchronization, as measured from initiation of the upshift, has elapsed.

3. The method of claim 2, wherein associating the recorded clutch pressure with a clutch torque includes:
   calculating and recording a set of PID gains; and
   using the recorded set of PID gains in a subsequent shift event of the transmission.

4. The method of claim 1, wherein executing the control action includes:
   associating the recorded clutch pressure with a corresponding clutch torque for the oncoming clutch in a lookup table; and
   using the lookup table to execute a subsequent shift event of the transmission.

5. The method of claim 1, wherein the calibrated slip error is between about 30 RPM and 50 RPM.

6. The method of claim 1, further comprising:
   verifying the stability of the calibrated flare prior recording the oncoming clutch pressure.

7. The method of claim 6, wherein verifying the stability of the calibrated flare includes activating a timer to thereby count through a calibrated duration.

8. A vehicle comprising:
   an internal combustion engine;
   an automatic transmission having an input member that is connected to the engine and a pair of clutches; and
   a controller in communication with the engine and the transmission, wherein the controller includes:
   a processor; and
   a tangible, non-transitory memory device on which is recorded instructions for determining the clutch pressure of an oncoming clutch during an upshift in an automatic transmission, and on which is recorded proportional-integral-derivative (PID) feedback control logic;
   wherein execution of the instructions by the processor causes the controller to:
      determine when an offgoing clutch and an oncoming clutch of the transmission have neared a speed synchronization point to within a calibrated window;
      activate the PID feedback control logic for the oncoming clutch;
      introduce, using the activated PID logic, a calibrated slip error between the rotational speeds of the offgoing and the oncoming clutches;
      hold engine speed in a calibrated flare using the PID logic;
      record the oncoming clutch pressure during the duration of the calibrated flare in the memory device; and
      execute a control action with respect to the transmission using the recorded oncoming clutch pressure.

9. The vehicle of claim 8, wherein the controller is configured to determine when the offgoing and oncoming clutches have neared the speed synchronization point by determining whether a calibrated time-to-synchronization, as measured from initiation of the upshift, has elapsed.

10. The vehicle of claim 8, wherein the controller executes the control action by:
    associating the recorded clutch pressure with a corresponding clutch torque for the oncoming clutch in a lookup table; and
    using the lookup table to execute a subsequent shift event of the transmission.

11. The vehicle of claim 10, wherein the controller associates the recorded clutch pressure by:
    calculating and recording a set of PID gains; and
    using the recorded set of PID gains in a subsequent shift event of the transmission.

12. The vehicle of claim 8, wherein the calibrated slip error is between about 30 RPM and 50 RPM.

13. The vehicle of claim 8, wherein the controller includes a timer, and is configured to verify the stability of the calibrated flare prior recording the oncoming clutch pressure in part by activating the timer to thereby count through a calibrated duration.

14. A system for use within a vehicle having an internal combustion engine, the system comprising:
    an automatic transmission having a pair of clutches and an input member that is connectable to the engine; and
    a controller in communication with the transmission, wherein the controller includes:
    a processor; and
    a tangible, non-transitory memory device on which is recorded instructions for determining the clutch pressure of an oncoming clutch during an upshift of the transmission, and on which is recorded proportional-integral-derivative (PID) feedback control logic;

wherein execution of the instructions by the processor, when the transmission has been connected to the engine in the vehicle, causes the controller to:
- determine when an offgoing clutch and an oncoming clutch of the transmission have neared a speed synchronization point to within a calibrated window;
- activate the PID feedback control logic for the oncoming clutch;
- introduce, using the activated PID logic, a calibrated slip error between the rotational speeds of the offgoing and the oncoming clutches;
- hold engine speed in a calibrated flare using the PID logic;
- record the oncoming clutch pressure during the duration of the calibrated flare in the memory device; and
- execute a control action with respect to the transmission using the recorded oncoming clutch pressure.

15. The system of claim 14, wherein the controller is configured to determine when the offgoing and oncoming clutches have neared the speed synchronization point by determining whether a calibrated time-to-synchronization, as measured from initiation of the upshift, has elapsed.

16. The system of claim 14, wherein the controller executes the control action by:
- associating the recorded clutch pressure with a corresponding clutch torque for the oncoming clutch in a lookup table; and
- using the lookup table to execute a subsequent shift event of the transmission.

17. The system of claim 16, wherein the controller associates the recorded clutch pressure by:
- calculating and recording a set of PID gains; and
- using the recorded set of PID gains in a subsequent shift event of the transmission.

18. The system of claim 14, wherein the calibrated slip error is between about 30 RPM and 50 RPM.

19. The system of claim 14, wherein the controller includes a timer, and is configured to verify the stability of the calibrated flare prior recording the oncoming clutch pressure in part by activating the timer to thereby count through a calibrated duration.

* * * * *